INVENTOR
CARL-ERIK GRANQVIST

INVENTOR
CARL-ERIK GRANQVIST,

BY Lawson and Taylor
ATTORNEYS

United States Patent Office 2,897,492
Patented July 28, 1959

2,897,492

ARRANGEMENT IN RADIO RECEIVERS FOR COOPERATION WITH DISTANCE INDICATING RADIO BEACONS

Carl-Erik Granqvist, Lidingö, Sweden, assignor to Svenska Aktiebolaget Gasaccumulator, Stockholm - Lidingö, Sweden, a corporation Application December 30, 1952, Serial No. 328,571

7 Claims. (Cl. 343—113)

From United States patent application Serial Number 140,580 (now abandoned) a kind of radio beacon is known, which may be used for indication not only of the bearing from the receiver place to the radio beacon, but also of the distance between the receiver and the beacon. The present invention refers to an arrangement in a radio receiver for cooperation with such a distance indicating radio beacon, and especially automatic distance indication, so that this can be read with a high degree of accuracy directly on an instrument. Thus the personnel need to take no other manual steps than those, which normally occur when an automatic radio receiver system should be put into operation. The invention also relates to certain details connected with said receiver arrangement for improving the bearing indication.

Figure 1:
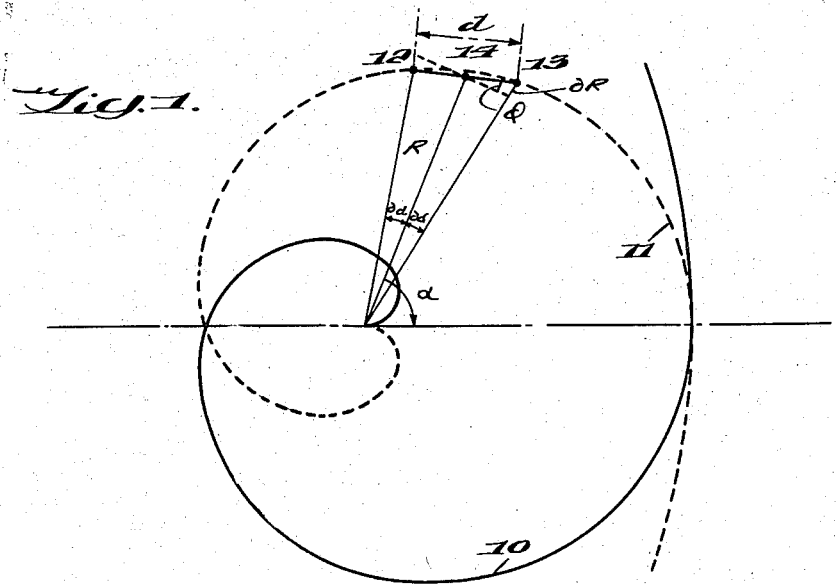
Figure 5:
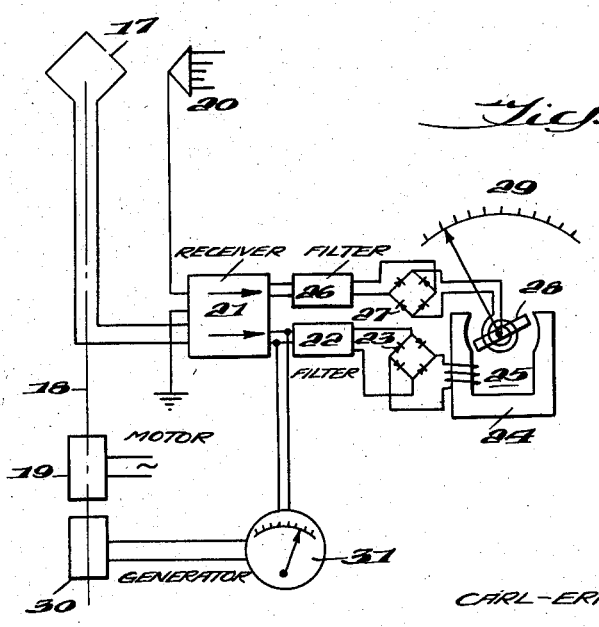
Figure 2:
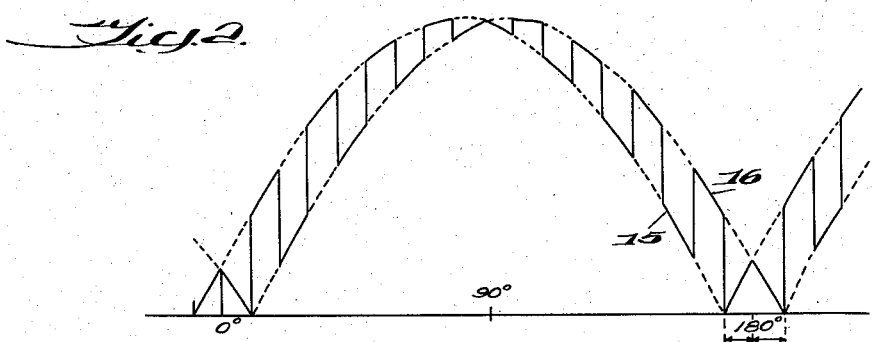
Figure 3:
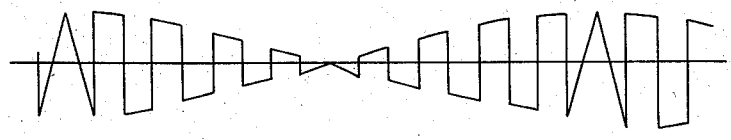
Figure 4:
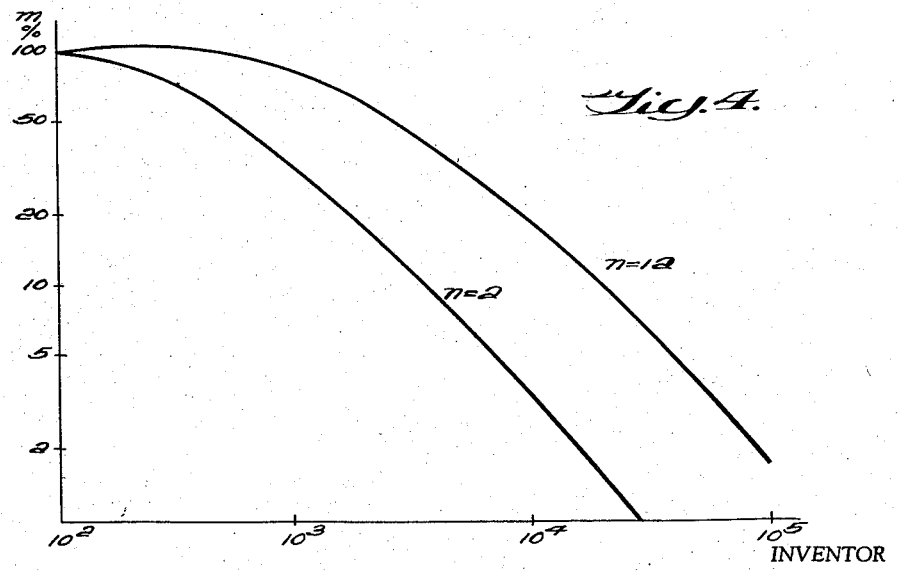

The invention is further described below in connection with the attached drawings, which show one form of execution thereof. Thus, Fig. 1 shows a radiation diagram for the transmitter together with certain constructions for explaining the action of the receiver, Figs. 2 and 3 show how the modulation may cause, by reversal of the field from the transmitter, an audio frequency oscillation of trapezoidic form, Fig. 4 shows how the maximum modulation degree of this oscillation varies with the distance between the transmitter and the receiver, and Fig. 5 shows one example of the arrangement of the receiver, so that one will simultaneously obtain a fully automatic indication partly of the distance between the transmitter and the receiver, and of the bearing too.

If the antenna of the transmitter, as proposed in the said U.S. patent application 140,580, is formed by a multipole frame antenna, then the field intensity of each so called distance field in the receiver may be described according to the following formula:

$$E = E_0 \cdot e^{-\beta R} \cdot \sin\left(\omega t + n \cdot \alpha - \frac{\omega R}{c}\right) \quad (1)$$

In this formula $E$ indicates the field intensity of the distance field, $E_0$ the momentary maximum value of this field intensity at the transmitter, $e$ the basis of the natural logarithmical system, $\beta$ the damping, $R$ the distance between the transmitter and the receiver, $\omega$ the angular speed of the field $= 2\pi\nu$, where $\nu$ is the frequency of the field, further $n$ indicates the half of the number of poles of the antenna system, $\alpha$ the reference angle in which the receiver is assumed to be situated, and $c$ the propagation speed of the field.

During the rotation of the field a simultaneous propagation of the field will take place, so that this will acquire a characteristic of the form of an Archimedes spiral, as schematically indicated in Fig. 1 with the line 10 drawn in full for one rotational direction and with the dotted line 11 for the other rotational direction. This means that the actual position in a horizontal plane through the transmitter antenna of any given wave front, for instance, the positive maximum point of a given period of the transmitted wave, will at any particular time have a position as indicated by the spiral curve, if the transmitter antenna is in the origin point of the diagram. It will be evident from said U.S. patent specification, that the distance is absolutely dependent upon the angle, which the tangent to a point of the spiral curve forms with the radius to the same point, it thereby being provided, that the receiver is situated in the prolongation of said radius. The present invention is based upon this fact.

Regarding now two closely situated points 12 and 13 on one spiral curve, which is assumed momentarily to represent the field displacement going on, the field intensities in these two points may obviously be represented by the formulae:

$$E' = E_0' \sin\left[\omega t - \frac{\omega \delta R}{c} + n(\alpha - \delta\alpha)\right] \quad (2)$$

$$E'' = E_0' \sin\left[\omega t + \frac{\omega \delta R}{c} + n(\alpha + \delta\alpha)\right] \quad (3)$$

In this formula, $E'$ represents the voltage or the field intensity in the point 12 and $E''$ the field intensity in the point 13, and $E_0'$ the momentary maximum value of the voltage. The voltage difference between the points 12 and 13 is then:

$$E_{\text{diff}} = -2E_0' \cos(\omega t + \alpha) \cdot \sin\left[\frac{\omega \delta R}{c} + n\delta\alpha\right] \quad (4)$$

For simplification the following is now introduced:

$$\delta\alpha = \frac{d \cdot \cos\varphi}{2R}; \quad \delta R = \frac{d}{2}\sin\varphi$$

which may be regarded allowable, because the magnitudes earlier indicated as differentials have in reality a limited magnitude. Thereby $d$ indicates the distance between the two points 12 and 13 and $\varphi$ the angle between the connection line of the two receiver antennas, applied in the said points, on one side, and the radial direction on to the transmitter O, on the other side. Thereby one may exchange the member:

$$\sin\left[\frac{\omega \delta R}{c} - n \cdot \delta\alpha\right] \text{ against } \sin\left[\frac{\omega}{c}\frac{d}{2}\sin\varphi - n\frac{d}{2}\frac{\cos\varphi}{R}\right] \quad (5)$$

If one chooses the conditions in such a way, that $$\frac{\omega}{c} = \frac{2\pi}{\lambda}$$

and because further $$\frac{d}{R}$$

can be regarded as very small, the sine of the angle $\varphi$ may with good approximation be exchanged against the angle itself, measured in bow measure. One then obtains:

$$E = E' = E'' = E_0' \cdot \cos(\omega \cdot t + \alpha) \cdot \frac{2d}{\lambda}\left[\sin\varphi + \frac{n\lambda}{2\pi R}\cos\varphi\right] \quad (6)$$

If now a direction finding frame is applied in the point 14, one will obtain a minimum in this for an angle $\varphi$, which is determined by $$\sin\varphi + \frac{n\lambda}{2\pi R}\cos\varphi = 0 \quad (7)$$

from which one obtains the minimum condition:

$$\varphi = \arctan\frac{n\lambda}{2\pi R} \quad (8)$$

Reversing now the rotational direction of the transmitter field, the reverse rotational direction $n$ will be negative, and the angular difference between the two direction finding minimums will be obtained as $2\varphi$. The mean angle represents the direction on to the transmitter.

If the rotational direction is periodically reversed, the signal intensity will vary in the manner, shown in Fig. 2. It is known, that the directional characteristic of the frame antenna mainly follows a sine curve, drawn in a polar coordinate system. This will, however, be displaced, as shown above, by an amount of $2\varphi$ when reversing the rotational direction, and the curve in question will therefore coincide with the sine curve 15 in one rotational direction but with the curve 16 in the other rotational direction. The reversal of the rotational direction therefore causes the reception alternatively to take place along the curve 15 and along the curve 16 or, in other words, along the superimposed trapezoidic curve, which is drawn with full lines in Fig. 2. The superimposed trapezoidic parts will below be regarded as representing a modulation wave, which will, after rectification, be audible in form of the wave, which is indicated in Fig. 3. It should thereby be observed that the intensity of the modulation signal will be maximal in the place, which should normally correspond to the minimum of received signal intensity. The maximum modulation degree will be expressed as:

$$m = \sin \varphi = \frac{\tan \varphi}{\sqrt{1-\tan^2 \varphi}} = \frac{\frac{n\lambda}{2\pi R}}{\sqrt{1-\left(\frac{n\lambda}{2\pi R}\right)^2}} \quad (9)$$

Fig. 4 indicates how the maximum modulation degree varies with the distance. It should be observed that the modulation degree, contrary to what is the case in normal, non-directed and above all not spirally directed radio transmission, will be dependent upon the distance between the transmitter and the receiver. From this it will, however, also be evident that the distance between the transmitter and the receiver should by suitable means be possible to determine in the form of the modulation degree of the receiver wave.

For this purpose one provides the receiver not only with the directed antenna, normally occurring in such a receiver, for instance a frame antenna, but also with a usual auxiliary antenna of non-directed kind. One obtains in the output circuit of the receiver partly an audio frequency voltage, corresponding to the rotational speed of the frame, and with an amplitude, corresponding to the reception capacity of the frame antenna, partly also an audio frequency voltage with a frequency, corresponding to the reversal frequency of the transmitter, and which has an amplitude, corresponding to the modulation present in the distance in question. The two voltages are fed to an instrument of the kind, indicated in Fig. 5.

In this instrument 17 indicates the rotating frame antenna, which is kept in rotation by being mounted on a shaft 18, driven by a motor 19. The fixed antenna is at 20. The voltages from the two antennas are provided to be added to a receiver 21 with two channels, said receiver being of such a kind, that the amplification in the two channels is in a fixed relation. The output audio frequency oscillation from the receiver, which is dependent upon the output signal from the antenna 17, is fed over a filter 22 and a rectifier, which may be made as a Graetz bridge, 23, to a winding 24 on the yoke of a turnable coil instrument 25, whereas the oscillation emanating from the antenna 20 is, after usual amplification and rectification to audio frequency, first applied on a filter 26 and from this on to a second rectifier bridge 27, which may be of the same kind as the rectifier bridge 23. The output direct current voltage from this is fed to the movable coil 28 of the turnable coil system 25. The scale 29 on the turnable coil instrument may be directly graded in the distance to the transmitter.

In order that this instrument should give correct indication, it is obviously of importance, that the amplification in the receiver 21 is of such a kind, that a practically exactly constant output voltage is obtained. The receiver should therefore be provided with an especially effective automatic volume control.

The winding around the yoke 24 intends to make the instrument such, that its sensitivity will be reversibly proportional to the voltage, corresponding to the rotation of the antenna 17. It will then immediately be obvious from Formula 9 above, that the instrument will give an indication absolutely dependent upon the distance from the transmitter to the receiver, or, in other words, upon the modulation degree, which is in its turn absolutely dependent upon said distance. Thus it can be seen that the specification gives the mathematical deduction of a law according to which the modulation factor of the waves (shown in Figs. 2 and 3) indicates the distance between the transmitter and the receiver. The meter 25 simply measures what the modulation factor is.

For the purpose of this measurement, the frame antenna 17 is provided to carry the modulation signal, whereas the open antenna system 20 is provided to carry an unmodulated wave. The measuring instrument 25 itself is a conventional one for measuring the modulation factor, which is well known in the art.

The modulation wave is not carried by the transmission from the transmitter to the receiver, but is artificially produced in the receiver part connected to the frame antenna 17, by the rotation of this frame antenna. Therefore, the signal propagation indicated by the lower arrow inside the block 21 of Fig. 5, is modulated with this modulation wave, whereas the signal indicated by the upper arrow is unmodulated with respect to this specific modulation wave, the modulation factor of which is to be measured in the instrument 25. The filters 22 and 26 simply have the purpose of removing other disturbing frequencies, so that the output from the filter 26 will appear as an unmodulated wave of the same frequency as the output of the filter 22, this wave, however, being modulated. After rectification in the two rectifiers 27 and 23, the output from the filter 26 will appear as a direct current. The output from the rectifier 23 will appear as the low frequency modulation wave, and consequently, in a well known manner the instrument 25 will also indicate the relation between the strength of these two waves, which is identical with the modulation factor.

The modulation factor, as was deducted mathematically in the specification, is, in turn, a measure of the distance between the transmitter and the receiver. Therefore, it is possible to indicate distance on meter scale 29, but, of course, the scale 29 would have to be calibrated in a way corresponding to the operation of the device shown in Fig. 5.

The instrument may easily be completed in such a way that it does not only indicate the distance from the transmitter to the receiver but also the bearing on to the transmitter. For this purpose there is provided on the shaft 18 an audio frequency generator 30, for instance a tooth wheel generator, the frequency of which is thus absolutely determined by the rotational position of the frame antenna 17, so that a given number of periods of the alternating voltage created by the generator 30 will be run through during one turn of the frame antenna, and so that this alternating voltage will always be in a given phase position, when the frame antenna during its rotation passes a predetermined position, for instance the zero bearing position. The voltage from the generator 30 is connected to one coil system in a phase measuring instrument 31, which may be formed by a fully ordinary so called cos $\varphi$-meter. The other coil system of this instrument is connected with the output audio frequency voltage from the amplifier 21, which is dependent upon the rotation of the frame 17, either before or after the filter 22. The instrument 31 will then indicate the phase displacement between the position of the frame 17 and the voltage created in the generator 30, which phase position is equal to the bearing on to the transmitter. It should be observed that the generator 30 can run through a great number of periods during one turn of the frame antenna, or, as one could also express it, during one bearing turn. Consequently, the instrument 31 may also be influenced to such a degree, that its movable coil system rotates a great number of turns. The instrument should for that reason be sturdy, so that it can follow the occurring setting movements, and it should further be combined with a counter for exact counting of the number of turns, which have been described during the setting movement by the movable coil system of the instrument.

In this way, one has thus been able to provide a simple system, which will simultaneously indicate with a high degree of precision the bearing on to the spiral directed radio beacon as well as the distance to said beacon, or, in other words, in a polar coordinate system indicate the exact position.

The invention is of course not limited to the form of execution of the system above described in detail, but different modifications may be made within the frame of the invention.

What is claimed is:

1. A receiver for ascertaining the distance from a radio transmitter, said receiver comprising a rotating directional antenna, a fixed antenna, an amplifier to independently amplify the signal received from each antenna, a rectifier to rectify each amplified signal, and a measuring instrument for comparing the output intensities from said rectifiers whereby an indication of distance can be obtained.

2. The apparatus defined in claim 1 wherein said measuring instrument comprises a yoke, a winding on said yoke and a movable coil rotatably mounted closely adjacent said yoke; the output from the rectifier associated with the rotatable antenna, which output is a low frequency modulation wave, being connected to the winding on said yoke; the output from the rectifier associated with the fixed antenna, which output is a direct current, being connected to the movable coil, whereby modulation factor can be obtained from said instrument, from which the distance between the transmitter and the receiver can be obtained.

3. A receiver for ascertaining the distance and bearing of a radio transmitter, said receiver comprising a rotating directional antenna, a fixed antenna, an amplifier to independently amplify the signal received from each antenna, a rectifier to rectify each amplified signal, an intensity measuring instrument for comparing the output intensities from said rectifiers, an audio frequency generator arranged to rotate synchronously with said rotating antenna, a phase measuring instrument having two coil systems, one coil system being connected to said generator, and the other coil system being connected to the output from the amplifier associated with the rotating antenna, whereby an indication of distance can be obtained from said intensity measuring instrument and an indication of bearing from said phase measuring instrument.

4. The apparatus as defined in claim 3 wherein said intensity measuring instrument comprises a yoke, a winding on said yoke and a movable coil rotatably mounted closely adjacent said yoke; the output from the rectifier associated with the rotatable antenna, which output is a low frequency modulation wave, being connected to the winding on said yoke; the output from the rectifier associated with the fixed antenna, which output is a direct current, being connected to the movable coil, whereby modulation factor can be obtained from said intensity measuring instrument, from which the distance between the transmitter and the receiver can be obtained.

5. A system for ascertaining distances by radio comprising, a radio transmitter, and a receiver designed for operation therewith, said receiver comprising a rotating antenna, a fixed antenna, an amplifier to independently amplify each of the signals received from said antennas, a rectifier to rectify each of said amplified signals and a measuring instrument for comparing the direct current output from the rectifier associated with said fixed antenna with the low frequency modulation wave output from the rectifier associated with said rotating antenna whereby an indication of modulation factor may be obtained, to which modulation factor the distance from the transmitter bears a known relation.

6. A method of ascertaining the distance between a radio transmitter and a receiver comprising the steps of, radiating a signal, receiving the transmitted signal by means of a receiver having a fixed antenna and a rotatable antenna, amplifying and rectifying the signal received by each antenna, and comparing the intensities thereof to arrive at an indication of distance.

7. A method of ascertaining the distance and bearing of a radio transmitter from a receiver comprising the steps of, transmitting a signal, receiving the transmitted signal by means of a receiver having a fixed antenna and a rotatable antenna, amplifying and rectifying the signal received by each antenna, comparing the intensities of said signals to arrive at an indication of distance, and comparing the phase displacement of the rotatable antenna with a reference value to arrive at an indication of bearing.

References Cited in the file of this patent

UNITED STATES PATENTS

| | | |
|---|---|---|
| 1,828,531 | Gage | Oct. 20, 1931 |
| 1,939,685 | Gage | Dec. 19, 1933 |
| 1,939,686 | Gage | Dec. 19, 1933 |
| 1,961,757 | Gage | June 5, 1934 |
| 2,202,400 | Roberts | May 28, 1940 |

FOREIGN PATENTS

| | | |
|---|---|---|
| 553,090 | Germany | June 24, 1932 |